United States Patent
Peukert et al.

(10) Patent No.: US 10,349,802 B2
(45) Date of Patent: Jul. 16, 2019

(54) METHOD FOR CALIBRATING A CLEANING DEVICE

(71) Applicant: MEIKO Maschinenbau GmbH & Co. KG, Offenburg (DE)

(72) Inventors: Thomas Peukert, Bühl (DE); Ingo Wiegand, Bühlertal (DE)

(73) Assignee: MEIKO MASCHINENBAU GMBH & CO. KG, Offenburg (DE)

( * ) Notice: Subject to any disclaimer, the term of this patent is extended or adjusted under 35 U.S.C. 154(b) by 421 days.

(21) Appl. No.: 15/026,383

(22) PCT Filed: Sep. 30, 2014

(86) PCT No.: PCT/EP2014/070914
§ 371 (c)(1),
(2) Date: Mar. 31, 2016

(87) PCT Pub. No.: WO2015/049228
PCT Pub. Date: Apr. 9, 2015

(65) Prior Publication Data
US 2016/0220089 A1    Aug. 4, 2016

(30) Foreign Application Priority Data
Oct. 2, 2013 (DE) .......... 10 2013 220 035

(51) Int. Cl.
*A47L 15/00* (2006.01)
*A47L 15/42* (2006.01)
(Continued)

(52) U.S. Cl.
CPC ......... *A47L 15/0021* (2013.01); *A47L 15/006* (2013.01); *A47L 15/0049* (2013.01);
(Continued)

(58) Field of Classification Search
CPC .................................................... A47L 15/006
See application file for complete search history.

(56) References Cited

U.S. PATENT DOCUMENTS

| 5,477,576 A | 12/1995 | Berkcan |
| 2008/0110479 A1* | 5/2008 | Veening ............. A47L 15/0049 134/113 |

(Continued)

FOREIGN PATENT DOCUMENTS

| CN | 1051094 A | 5/1991 |
| CN | 101738287 A | 6/2010 |

(Continued)

OTHER PUBLICATIONS

Ando, Kentaro & Matsumoto, Takeo & Nagahama, Tetsuya & Ueki, Iwao & Takatsuki, Yasushi & Kuroda, Yoshifumi. (2005). Drift Characteristics of a Moored Conductivity Temperature Depth Sensor and Correction of Salinity Data. Journal of Atmospheric and Oceanic Technology—J Atmos Ocean Technol. 22. 10.1175/JTECH1704.1.*

(Continued)

*Primary Examiner* — Charles D Garber
*Assistant Examiner* — Alia Sabur
(74) *Attorney, Agent, or Firm* — Foley & Lardner LLP (57) ABSTRACT

A method for calibrating a cleaning device that has at least one sensor for detecting at least one state variable, including carrying out a calibration measurement, establishing an electronic connection between the calibration sensor and a controller of the cleaning device, and electronically transmitting the reference value to the controller; and comparing the reference value with at least one measurement value of the sensor of the cleaning device and adjusting at least one correction function in accordance with the comparison. At least one state variable is detected and at least one reference value is determined by means of at least one calibration (Continued)

sensor independently of the sensor of the cleaning device. Future measurement values of the sensor of the cleaning device are automatically corrected using the correction function.

14 Claims, 1 Drawing Sheet

(51) Int. Cl.
    *A47L 15/46*     (2006.01)
    *G01D 18/00*     (2006.01)
    *A61G 9/02*     (2006.01)
    *H04W 84/10*     (2009.01)

(52) U.S. Cl.
    CPC ....... *A47L 15/0063* (2013.01); *A47L 15/0076* (2013.01); *A47L 15/4287* (2013.01); *A47L 15/4289* (2013.01); *A47L 15/46* (2013.01); *A61G 9/02* (2013.01); *G01D 18/00* (2013.01); *H04W 84/10* (2013.01); *A47L 2401/12* (2013.01); *A47L 2401/14* (2013.01); *A47L 2401/17* (2013.01); *A47L 2401/18* (2013.01); *A47L 2401/19* (2013.01); *A47L 2501/26* (2013.01)

(56) References Cited

U.S. PATENT DOCUMENTS

| | | | | |
|---|---|---|---|---|
| 2008/0115807 | A1* | 5/2008 | Gaus | A47L 15/0021 |
| | | | | 134/18 |
| 2009/0183753 | A1* | 7/2009 | Maennle | A47L 15/0021 |
| | | | | 134/18 |
| 2009/0201968 | A1* | 8/2009 | Schulze | G01K 15/00 |
| | | | | 374/1 |
| 2010/0125425 | A1 | 5/2010 | Jacob et al. | |
| 2010/0132735 | A1 | 6/2010 | Gaus et al. | |
| 2010/0316086 | A1* | 12/2010 | Engelstad | G01K 1/14 |
| | | | | 374/1 |
| 2011/0018728 | A1* | 1/2011 | Uhlhorn | A47L 15/4297 |
| | | | | 340/657 |
| 2011/0301903 | A1* | 12/2011 | Humbert | G01D 18/008 |
| | | | | 702/104 |
| 2013/0008477 | A1 | 1/2013 | Forst et al. | |
| 2014/0041688 | A1 | 2/2014 | Maennle et al. | |

FOREIGN PATENT DOCUMENTS

| | | | |
|---|---|---|---|
| DE | 42 22 240 A1 | 1/1994 | |
| DE | 10 2004 056 052 A1 | 6/2006 | |
| DE | 44 46 775 B4 | 7/2006 | |
| DE | 10 2007 025 263 A1 | 10/2007 | |
| DE | 10 2008 031249 A1 | 1/2010 | |
| EP | 1 245 714 A2 | 10/2002 | |
| EP | 2228000 A2 * | 9/2010 | ......... A47L 15/0049 |
| JP | 05-149790 A | 6/1993 | |
| JP | 2005-279176 A | 10/2005 | |
| JP | 2008-089974 A | 4/2008 | |
| JP | 2010-096588 A | 4/2010 | |
| JP | 2010-101743 A | 5/2010 | |

OTHER PUBLICATIONS

International Preliminary Report on Patentability issued in related International Patent Application No. PCT/EP2014/070914, dated Apr. 14, 2016.
Notice of Reasons for Rejection issued in related Japanese Patent Application No. 2016-519870, dated Apr. 4, 2017.
International Search Report issued in related International Patent Application No. PCT/EP2014/070914, completed Dec. 1, 2014.
English Translation of the International Preliminary Report on Patentability issued in related International Patent Application No. PCT/EP2014/070914, dated Apr. 14, 2016.
Office Action issued in related Chinese Patent Application No. 201480053454.3, dated Apr. 2, 2018.
Office Action issued in related Chinese Patent Application No. 201480053454.3, dated Nov. 5, 2018.

* cited by examiner

METHOD FOR CALIBRATING A CLEANING DEVICE

CROSS-REFERENCE TO RELATED APPLICATIONS

This application is the National Phase of International Patent Application No. PCT/EP2014/070914, filed Sep. 30, 2014, which claims priority from German Patent Application No. 10 2013 220 035.8, filed Oct. 2, 2013. The contents of these applications are incorporated herein by reference in their entirety.

FIELD OF THE INVENTION

The invention relates to a method for calibrating a cleaning device. The invention further relates to a cleaning device and also to a construction kit comprising a cleaning device and also a calibration sensor which are designed to carry out the method according to the invention. Cleaning devices of said kind can be used, for example, in the field of dishwashing technology, in particular in the field of commercial dishwashing technology. However, cleaning devices of this kind can furthermore also be used in the care home sector or in the field of hospital technology, for example for cleaning containers for collecting human waste, such as bedpans for example. However, other fields of use are also feasible in principle.

PRIOR ART

A large number of cleaning devices, also called cleaning apparatuses, which can clean and/or disinfect washware are known from the prior art. The design of these cleaning devices depends to a great extent on the various boundary conditions, such as the type of washware which is to be cleaned, the degrees of soiling, the throughput and similar conditions for example. By way of example, reference can be made to cleaning devices which are described, for example, in DE 10 2004 056 052 A1 or in DE 10 2007 025 263 A1.

Setting and/or monitoring certain state variables plays a significant role in numerous cleaning devices. These state variables include, in particular, the state variables temperature and/or pressure, for example within a cleaning chamber of the cleaning device. In order to be able to ensure a certain cleaning effect, in particular a hygiene effect, disinfection effect or germ-killing effect, it is necessary in many cases to ensure a minimum temperature and/or to ensure that the washware is subjected to the action of a minimum number of so-called thermal equivalents. Reference can also be made, for example, to the abovementioned prior art in this respect.

In many cases, cleaning devices, such as commercial dishwashers and/or cleaning and disinfection apparatuses for cleaning containers for collecting human waste for example, contain one or more sensors for the purpose of monitoring state variables, such as temperature and/or pressure for example. Said cleaning devices can comprise one or more temperature sensors for example. The invention will be substantially described below with reference to the temperature as a state variable and to temperature sensors. However, as an alternative or in addition, the invention can also be applied in the same way to other state variables, for example the pressure.

The degree of reliability of the measurement values of the state variables, which measurement values are detected by the sensors, plays an important role particularly for the purpose of ensuring certain hygiene effects or disinfection effects. In conventional apparatuses, a high level of trust is generally placed in the measurement values of the sensors, wherein tolerances of the sensors according to the manufacturer information may also be taken into account. Calibration of the sensors or the entire sensor measurement chain, including the corresponding contact resistors, measurement printed circuit boards, interfaces and lines, in many cases either does not take place or is generated by means of simple reference measurements which are carried out using a separate and/or independent measurement system for example. Control or correction or calibration is performed, for example, after manual evaluation of the reference measurements by manual intervention in a controller of the cleaning device, for example by inputting so-called offsets.

However, this fails to take into account various factors which can lead to considerable corruption of the measurement values in the case of numerous conventional cleaning devices. For example, as cited above, manufacturer information generally relates to the sensor in question and not to the entire sensor measurement chain which contains all of the measurement peripherals including corresponding contact resistors. In addition, production faults or tolerances can occur even when sensors are carefully selected. Aging processes of the sensors in question should also be taken into account.

On the other hand, neglecting to perform calibration can lead to fatal malfunctions since, for example, it may then no longer be possible for the cleaning device to ensure a required hygiene effect. Particularly in the field of care utensils, such as so-called cleaning and disinfection apparatuses for example, this can lead to dangerous contamination or insufficient sterilization of the washware, this in turn possibly resulting in dangerous diseases being spread.

US 2013/0008477 A1 describes a method for filling a washing chamber of a dishwasher. Amongst other things, an analog pressure sensor is used in this case in order to monitor the filling level. Furthermore, said document describes that the analog pressure sensor can be calibrated and can be set to match influences, such as the temperature and the drift over the service life for example, which can be measured using other sensors. Offset correction is also described.

US 2009/0183753 A1 describes a method for ensuring a thermal hygiene effect. In this case, the temperature profile within a chamber is monitored by means of a temperature sensor.

DE 44 46 775 B4 describes a method for compensating a thermal offset drift of sensors. In this case, offset variables for certain temperature sensors given a plurality of associated temperature values are stored in a data memory and then temperature correction is carried out during operation.

U.S. Pat. No. 5,477,576 discloses temperature compensation for a turbidity sensor in washing devices, such as dishwashers for example. Said document is based on the problem of dishwashers being operated over a relatively large temperature range, for example of from 24° C. to 74° C. Accordingly, a temperature of 49° C. is selected as the reference temperature and, by detecting an actual temperature, the turbidity value of a turbidity sensor is always specified as a reference turbidity value at the reference temperature of 49° C.

Conventional calibration processes are generally complicated and susceptible to faults. In this case, it is generally necessary to distinguish between the processes during production of the cleaning device and processes during use of the cleaning device, for example within the scope of maintenance and/or after replacement of a component, for example a component of a sensor measurement chain.

Many conventional systems are highly complicated since manual starting of an independent calibration system and manual evaluation of the calibration data are necessary. Manual intervention in a sensor measurement chain and/or corresponding manual intervention in a control system of the cleaning device are/is generally also necessary. Interventions of this kind are time-consuming and also subject to faults in practice. Furthermore, deliberate manipulation or corruption of the calibration process is possible, for example to make quality features of the cleaning devices look better. In addition, many conventional calibration processes require disassembly of the corresponding sensors in order to then calibrate said sensors separately. However, removal of the corresponding sensors, in particular within the scope of maintenance work, is complicated in practice. Servicing work requires the removal of the sensors and insertion of the sensors into a corresponding calibrator in which defined state variables are applied to the sensors. However, calibrators of this kind are expensive and take up a large amount of volume and therefore are carried by servicing personnel only in exceptional circumstances in practice.

OBJECT OF THE INVENTION

An object of the present invention is therefore to provide a method for calibrating a cleaning device, a cleaning device and a construction kit, which method, cleaning device and construction kit at least largely avoid the disadvantages of known methods, cleaning devices and construction kits. A particular aim is to allow calibration both within the scope of production of the cleaning device and also within the scope of maintenance work, which calibration can be carried out in a simple and quick manner, is cost-effective and nevertheless reliable and can be carried out with a comparatively low level of expenditure on equipment.

DISCLOSURE OF THE INVENTION

This object is achieved by a method, a cleaning device and a construction kit having the features of the independent patent claims. Advantageous developments, which can be realized on their own or in any desired combination, are presented in the dependent claims.

In the text which follows, the terms "have", "exhibit", "comprise" and "include" or any desired grammatical variations thereof are used in a non-exclusive manner. Accordingly, said terms can relate both to situations in which, along with features introduced by said terms, no further features are present or to situations in which one or more further features are present. For example, the expression "A has B", "A exhibits B", "A comprises B" or "A includes B" can refer both to situations in which, apart from B, there are no further elements in A (that is to say, to a situation in which A consists exclusively of B) and to situations in which, in addition to B, there are one or more further elements in A, for example element C, elements C and D or even further elements.

Furthermore, the terms "preferably", "in particular", "for example" and similar terms are used in conjunction with optional features in the text which follows, without restricting alternative embodiments as a result. Therefore, features which are introduced by these terms are optional features and said features are not intended to restrict the scope of protection of the claims, and in particular of the independent claims. Therefore, the invention may, as the skilled person will recognize, also be carried out using other refinements. Similarly, features which are introduced by "in an embodiment of the invention" or by "in an exemplary embodiment of the invention" will be understood to mean optional features, without alternative refinements or the scope of protection of the independent claims intending to be restricted by said optional features. Furthermore, all of the possible ways of combining the features introduced by these introductory expressions with other features, be they optional or non-optional features, should remain unaffected by said introductory expressions.

A method for calibrating a cleaning device is proposed in a first aspect of the present invention. Within the scope of the present invention, calibration is intended to be understood to be, in general, a process in which at least one measurement value of at least one state variable is checked and/or is corrected or converted into a corrected measurement value in such a way that the corrected measurement value corresponds to an actual value of the state variable, at least within a predefined tolerance.

Within the scope of the present invention, a state variable is intended to be understood to be, in general, a quantifiable variable of at least one environmental parameter which can influence the operation of the cleaning device and/or a cleaning result of the cleaning device in any way. As will be explained in greater detail below, this at least one state variable may be, in particular, a temperature and/or at least one pressure. By way of example, the at least one state variable may be a temperature within a cleaning chamber of the cleaning device and/or a temperature of at least one cleaning fluid of the cleaning device which is applied to the washware. As an alternative or in addition, the at least one state variable may also be, for example, at least one pressure, for example at least one pressure within a cleaning chamber of the cleaning device and/or a pressure of at least one cleaning fluid. Furthermore, combinations of state variables can also be calibrated, for example by at least one state variable in the form of at least one temperature and at least one state variable in the form of at least one pressure being calibrated in the method at the same time.

Within the scope of the present invention, a cleaning device is intended to be understood to be, in general, a device which is designed to at least partially free washware of adhering impurities and/or germs. In particular, the cleaning device can be designed to apply at least one cleaning fluid, that is to say a cleaning liquid and/or a gaseous cleaning fluid, to the washware, as explained above. By way of example, this cleaning fluid can comprise a cleaning liquid, for example an aqueous cleaning liquid, optionally with the addition of one or more additives, for example at least one additive selected from the group comprising a detergent concentrate, a final-rinse aid and a disinfectant. As an alternative or in addition, the cleaning fluid can comprise, for example, steam. However, other refinements are also feasible in principle.

As is stated in further detail below, the cleaning device can be, for example, a dishwasher, in particular a commercial dishwasher, for example a batch dishwasher and/or a conveyor dishwasher. However, as an alternative or in addition, the cleaning device can also be designed entirely or partially as a cleaning and disinfection apparatus, for example as a cleaning device which is designed to clean containers for collecting human waste. In this respect, reference can be made, in general, for example to the cleaning devices which are described in DE 10 2004 056 052 A1 and/or in DE 10 2007 025 263 A1. The cleaning device can also be a washer as can be used for cleaning containers in the field of food production and/or food processing. Furthermore, the cleaning device may be a disinfection washer, for example a washer for cleaning and disinfecting respirator masks. However, other refinements are also feasible in principle.

The cleaning device has at least one sensor for detecting at least one state variable. Within the scope of the present invention, a sensor is intended to be understood to be, in general, a device which is designed to detect one or more measurement values of the state variable, preferably in the form of one or more electronic measurement values. The measurement values can be in analog and/or digital form. The sensor can comprise, for example, at least one sensor element which is designed to generate at least one sensor signal, for example an analog or digital sensor signal, in accordance with the state variable which is to be detected. However, in addition to the at least one sensor element, the sensor can comprise one or more further elements. For example, the sensor can comprise, in particular, one or more supply lines which are connected to the sensor element and/or other elements of the sensor. Furthermore, at least one actuation and/or evaluation circuit can be provided for example, it being possible for said actuation and/or evaluation circuit to be connected to the sensor element and said actuation and/or evaluation circuit often also being called a measurement printed circuit board or simply only printed circuit board. Furthermore, the sensor can comprise further elements, such as at least one analog/digital converter (A/D converter) and/or at least one signal line and/or data line and/or an interface for example. The total unit, which is made up of the at least one sensor element and optionally the at least one further element of the sensor, can together form a sensor system and/or a measurement chain of the sensor which ultimately can be connected, for example, to a controller which is explained in further detail below. The sensor itself can therefore be a sensor system or can be a constituent part of a sensor system. The measurement chain and the design of said measurement chain can ultimately determine how a specific value of the state variables and/or a change in this value affect one or more sensor signals which are made available to the controller. The sensor can therefore comprise, in total, at least one sensor element and also at least one further element, in particular at least one further element selected from the group comprising: an actuation and/or evaluation circuit (in particular for processing at least one measurement value or sensor value), an interface, an analog/digital converter (A/D converter), a wireless and/or wired transmission element, a signal line and/or data line, a voltage supply, an A/D converter, an indicator element, a data memory and a radio module. However, other refinements are also possible.

By way of example, the sensor can comprise at least one temperature sensor, in particular at least one sensor element in the form of, for example, a temperature-dependent resistor, for example an NTC and/or a PTC. As an alternative or in addition, the sensor can comprise at least one sensor element in the form of a pressure sensor, for example in the form of a micromechanical pressure sensor. However, other refinements are also feasible.

The method comprises the following steps which are preferably, but not necessarily, carried out in the illustrated order. Furthermore, the method can comprise additional method steps, not illustrated. Furthermore, the method steps can also be carried out in a different order. In addition, individual, a plurality of or all of the method steps can be carried out repeatedly. Furthermore, individual or a plurality of method steps can be carried out in parallel with respect to time or with an overlap with respect to time.

The method steps are:
a) carrying out a calibration measurement, wherein the at least one state variable is detected and at least one reference value is determined by means of at least one calibration sensor independently of the sensor of the cleaning device;
b) establishing an electronic connection between the calibration sensor and a controller of the cleaning device, and electronically transmitting the reference value to the controller; and
c) comparing the reference value with at least one measurement value of the sensor of the cleaning device and adjusting at least one correction function in accordance with the comparison, wherein future measurement values of the sensor of the cleaning device are automatically corrected using the correction function.

In this case, a calibration measurement is intended to be understood to be, in general, a process in which, as explained, the reference value is determined. Within the meaning of the above definition, a calibration sensor is intended to be understood to be, in general, a sensor which is not a constituent part of the cleaning device or which can be handled and operated independently of other constituent parts of the cleaning device, and which preferably has a high degree of reliability in general. The calibration sensor can comprise, as explained above, a calibration sensor element and also optionally at least one further element, for example in each case one or more elements selected from the group comprising: an actuation and/or evaluation circuit (in particular for processing at least one measurement value or sensor value), an interface, an analog/digital converter (A/D converter), a wireless and/or wired transmission element, a signal line and/or data line, a voltage supply, an A/D converter, an indicator element, a data memory and a radio module. However, other refinements are also possible. By way of example, the calibration sensor can be a sensor which is calibrated independently of other constituent parts of the cleaning device and which can be calibrated, for example, at the factory and/or within the scope of the present method, for example in accordance with a corresponding calibration prespecification. One or more calibrators may be used for example, said calibrators being designed to set defined environmental conditions in a calibration environment, for example a defined calibration temperature and/or a defined calibration pressure in a chamber of the calibrator. A calibrator can be, for example, a portable apparatus. By way of example, the calibration sensor can comprise a calibration temperature sensor which has an accuracy of at least +/−1.0° C. or better, in particular an accuracy of +/−0.5° C. or better, in the range of from +10° C. to +100° C.

Within the scope of the present invention, independent detection of the at least one state variable independently of the sensor of the cleaning device is intended to be understood to be a process in which the same state variable which is also detected by the sensor of the cleaning device is also detected by the calibration sensor without the measurement by the calibration sensor being influenced by the sensor of the cleaning device. The calibration sensor therefore detects the state variable and in the process forms at least one reference value which characterizes the magnitude of the state variables. Therefore, a reference value, also called a comparison value, is intended to be understood to be, in general, a measurement value or a set of measurement values which is formed by the calibration sensor by detecting the state variables, that is to say at least one measurement value of the state variables, which measurement value is detected by the calibration sensor. In this case, a plurality of reference values can also be detected, for example a series of reference values of the same state variables, for example a time sequence. As an alternative, a plurality of calibration sensors for detecting a plurality of types of state variable can also be used, as can a calibration sensor which is designed to detect a plurality of state variables at the same time and therefore to determine a plurality of reference values of different state variables.

Establishing an electronic connection in method step b) is intended to be understood to be, in general, a process which allows electronic transmission of the at least one reference value to the controller of the cleaning device. By way of example, a wired and/or a wireless connection can be used for this purpose, wherein a wireless connection is preferred, in particular a purely wireless connection without additional wired connection. Once the electronic connection is established, said electronic connection can be retained for the transmission of further reference values or can be disconnected after transmission of the reference value.

A controller of the cleaning device is intended to be understood to mean, in general, a device which is a constituent part of the cleaning device and which is designed to control and/or to regulate one or more functions of the cleaning device. The controller can be of unipartite or multipartite design. In particular, the controller can have at least one data processing device, for example at least one microcomputer. As will be explained in further detail below, the controller of the cleaning device can be designed, for example, to set one or more state variables and/or one or more parameters of the cleaning device. As an alternative or in addition, the controller can also be designed to control a program sequence of the cleaning device. By way of example, the controller can be designed to carry out one or more cleaning programs and/or to set other parameters of the cleaning process. The controller can be, for example, a central machine controller of the cleaning device. The controller can be centralized or else decentralized. Furthermore, the controller can comprise one or more interfaces, for example for transmitting data and/or commands between an external device, for example a computer, and the cleaning device, and/or for transmitting information. Transmission can be unidirectional or else bidirectional. Furthermore, the controller can comprise one or more user interfaces, for example one or more displays and/or one or more keypads. However, other refinements are also feasible in principle.

In this case, electronic transmission of the reference value to the controller is intended to be understood to be, in general, a process in which the reference value is transmitted from the calibration sensor to the controller without the involvement of human transmission action, in particular without the involvement of a manual input. Therefore, the electronic transmission can be performed, for example, exclusively in the form of wired and/or wireless signals.

Comparison of the reference value with at least one measurement value of the sensor of the cleaning device in method step c) is intended to be understood to be, in general, a process in which the reference value and the measurement value are checked for correspondence and/or deviations. If, in this case, reference values and/or measurement values of different kinds of state variables are used, this comparison in method step c) includes only comparison of at least one reference value of a state variable with at least one measurement value of the same state variable. Irrespective of this, it is additionally possible to optionally perform at least one comparison of at least one reference value of another state variable with at least one measurement value of the same other state variable.

As is explained in greater detail below, the comparison can comprise, for example, the calculation of a difference, in which the reference value is subtracted from the measurement value and/or in which the measurement value is subtracted from the reference value. However, as an alternative or in addition, the comparison can also comprise, for example, the calculation of a quotient, in which a quotient of the reference value and of the measurement value and/or a quotient of the measurement value and of the reference value are/is calculated.

Within the scope of the present invention, a correction function is intended to be understood to be, in general, an algorithm which is designed to influence a measurement value which is provided by the sensor of the cleaning device in such a way that the measurement value corresponds to the actual value of the corresponding state variable, which is intended to be detected by the sensor, at least within the scope of a predefined tolerance range (for example one or more tolerance thresholds). In this case, the correction function can be applied directly to the measurement value or can also enter within the scope of further processing of the measurement value, for example when thermal equivalents are calculated from a temperature measurement value and one or more other variables (for example a duration of a temperature application operation).

In this case, an adjustment of the correction function is intended to be understood to be, in general, influencing of the correction function which takes into account the comparison of the reference value with the measurement value. The correction function can already exist before this adjustment or can also be generated for the first time within the scope of the adjustment.

Future measurement values of the sensor of the cleaning device are automatically corrected using the correction function. As stated above, this correction can be performed directly by the correction function being applied directly to the measurement values, or else can be performed for the first time within the scope of further processing of the measurement values. For example, the measurement values can enter one or more evaluation functions as variables, wherein the evaluation function can be corrected in accordance with the correction function. Other refinements are also possible in principle.

The method can be carried out in particular at least largely in an automated manner. The calibration measurement can be carried out, for example, in such a way that it at least approximately simulates a cleaning program. Furthermore, the calibration measurement can be carried out in such a way that certain state variables which either are known or at least can be detected on the basis of the reference value being determined are set. For example, a real or hypothetical cleaning program can be carried out within the scope of the calibration measurement, for example by the calibration sensor being placed in a cleaning chamber of the cleaning device and the cleaning device being put into operation. By way of example, application of a cleaning fluid and/or a temperature application operation can be performed within the scope of this commissioning.

In particular, method steps b) and/or c) can be carried out entirely or partially automatically, for example without user intervention. However, in particular, method step b) can also be carried out, for example, in a partially automated manner, for example by the electronic connection between the calibration sensor and the controller being established manually, but the electronic transmission of the reference value to the controller then being performed automatically. Method step c) can, in particular, be carried out fully automatically. A user action, for example by a corresponding calibration program of the cleaning device being initiated, may be required in order to initiate method steps b) and/or c). This initiation can be performed, for example, automatically by establishing the electronic connection between the calibration sensor and the controller and/or can be performed by a user and/or by maintenance personnel calling up a corresponding calibration program.

As explained above, the comparison of the reference value with the at least one measurement value of the sensor and/or the adjustment of the correction function in method step c) can be performed in different ways. Therefore, the correction function can contain, for example, at least one offset, that is to say a predefined value which is subtracted from the measurement values and/or is added to the measurement values within the scope of the correction of the measurement values using the correction function. Therefore, at least one difference between the reference value and the measurement value or vice versa can be calculated, for example, in method step c), wherein the correction function can contain the difference as an offset, and/or wherein the difference can be added to the correction function as an offset. The offset can be automatically subtracted during future measurement values of the sensor of the cleaning device or can be added to future measurement values of the sensor of the cleaning device. As an alternative or in addition, at least one quotient between the reference value and the measurement value can also be calculated during the comparison of the reference value with the at least one measurement value of the sensor in method step c), wherein the correction function can contain the quotient or the inverse of said quotient as a correction factor, and/or wherein the quotient or the inverse of said quotient can be added to the correction function as a correction factor. The correction factor can be, in particular automatically, multiplied by future measurement values of the sensor of the cleaning device.

However, these simple possible correction functions are merely exemplary embodiments of corresponding correction functions. Relatively complex correction functions are also possible in general, for example the application of relatively complex correction algorithms and/or the application of relatively complex correction curves. By way of example, the correction function can contain at least one polynomial, wherein the parameters of the polynomial can be determined within the scope of method step c). Therefore, comparisons given different magnitudes of the state variables can be carried out for example, for example at different temperatures and/or at different pressures, and the parameters of the correction function, for example a polynomial, can be correspondingly adjusted. A correction function which can be automatically applied to future measurement values of the cleaning device can then be provided using these adjusted parameters. As an alternative or in addition, corresponding correction functions which can be selected in accordance with the comparison can also be stored, for example in a data memory of the controller. Various options are feasible.

As stated above, the at least one state variable can contain, in particular, at least one variable selected from the group comprising: a temperature, in particular a temperature in a cleaning chamber of the cleaning device and/or a temperature of at least one cleaning fluid of the cleaning device; a pressure, in particular a pressure in a cleaning chamber of the cleaning device; a degree of moisture, in particular a degree of moisture in a cleaning chamber of the cleaning device; a volume flow and/or a mass flow, in particular in a section of a line system of the cleaning device.

As stated above, the electronic transmission in method step b) can preferably exclusively involve transmission in electronic form. In particular, method step b) can be carried out via at least one electronic interface, in particular an interface via which the calibration sensor can be directly or indirectly reversibly or irreversibly connected to the controller. In particular, method step b) can be carried out by means of a wireless connection, in particular a radio connection. As an alternative or in addition, an interface selected from amongst an infrared interface and a Bluetooth interface can be used in method step b). Once again as an alternative or in addition, method step b) can also be carried out using a docking station, wherein the calibration sensor is connected to the docking station in order to establish the electronic connection, wherein the reference value is transmitted from the calibration sensor to the docking station, and wherein the reference value is transmitted to the controller by the docking station. Therefore, the at least one calibration measurement can be carried out, for example, first, then the calibration sensor can be connected to the docking station, and the at least one reference value can be transmitted to the controller by means of the docking station.

The calibration sensor can have, in particular, at least one data memory and can be designed to detect a plurality of reference values and to store said plurality of reference values in the data memory. The data memory can comprise, for example, a volatile and/or non-volatile data memory.

In general, the calibration sensor can be an autonomous system which can be designed, for example, to detect the reference value independently of and without a physical connection to other apparatuses. For example, the calibration sensor can be a completely encapsulated calibration sensor which is surrounded by a housing. Furthermore, the calibration sensor can have a dedicated energy supply, for example an energy store. The at least one optional data memory can be contained, for example, in the housing. The data memory can be designed to store a plurality of the reference values at different time points and/or to store a plurality of different types of reference values, for example reference values of different state variables.

The data memory can be designed, in particular, to comprise a plurality of the reference values in the form of a time sequence of the reference values. By way of example, the calibration sensor can be designed to detect the reference values and preferably to store said reference values in the data memory at regular or irregular intervals, for example at a predefined or variable measurement frequency. In addition to the plurality of reference values, further information can furthermore be stored. For example, the time points at which the reference values were detected for each of the plurality of reference values can be stored in the data memory. For example, time stamps relating to the measurement values can be detected and stored.

The controller can be designed to match the time points at which the measurement value and the reference value were detected to one another during the comparison. For example, it is possible to ensure that only measurement values and reference values which were detected at least approximately at the same time, for example at the same time and/or within the scope of a predefined time window with a tolerance which does not exceed a predefined time difference, are compared with one another. For example, it is possible to ensure that only reference values and measurement values which correspond at least approximately to the same value of the state variables are compared with one another, even when there is a change in the state variables. By way of example, changes in the state variables, for example a change in temperature within a cleaning chamber and/or within the cleaning fluid, can also be carried out during the calibration measurement in this way, wherein, for example, calibration measurements can be carried out at different values of the state variables. Matching the time points of the measurement values and reference values can ensure that the corresponding values are compared with one another. Therefore, the controller can be designed, in general, to register, in addition to the at least one measurement value of the sensor of the cleaning device, at least one time point at which the measurement value was detected, for example by the measurement value or the measurement values also being provided with a time stamp. The time point at which the at least one measurement value was detected can then be matched with the time points at which the reference values were detected. In this case, matching is intended to be understood to be, as explained above, a process in which it is ensured that the measurement value and the reference value which is to be compared with this measurement value have been detected at the same time or at least within the scope of a predefined time window at the same time.

As stated above, the calibration sensor can be designed to transmit the plurality of reference values to the controller. This transmission of the reference values to the controller can be performed online, for example by accompanying detection of a reference value at the same time or in a timely manner, for example within the scope of a predefined transmission cycle, the reference value also being transmitted to the controller before the next reference value is detected. However, as an alternative or in addition, transmission can also be performed within the scope of bundling a plurality of reference values, for example by a plurality of reference values initially being collected in the data memory of the calibration sensor and then being transmitted to the controller in a bundle. Said transmission can be performed, for example, within the scope of the embodiment of the docking station stated above.

A diagnosis of the cleaning device can be made within the scope of method step c). Within the scope of the present invention, a diagnosis is intended to be understood to be, in general, a process in which an ability of the cleaning device to function is qualified and/or quantified. In particular, in method step c), a warning can be generated when, during the comparison of the reference value with the measurement value, a deviation outside a predefined tolerance range is ascertained. This warning can be generated in electronic form or else in any desired other form. By way of example, an electronic transmission can be made to a log and/or to another device. As an alternative or in addition, a warning can also be output to a user, for example to operating personnel and/or maintenance personnel, for example a warning in one or more of the following forms: a visual form, for example by means of at least one display and/or at least one indicator element; an acoustic warning, for example by means of a loudspeaker; and a haptic warning, for example in the form of a vibration. However, other refinements are also feasible.

As an alternative or in addition, in method step c), a freedom-from-fault message can be output when, during the comparison of the reference value with the measurement value, a deviation within a predefined freedom-from-fault range is ascertained. This freedom-from-fault message can be output, for example, once again in electronic form and/or in another form. By way of example, the freedom-from-fault message can once again be output to a log and/or to a user, for example in one or more of the forms presented above. The tolerance range can correspond to the freedom-from-fault range or else can differ from said freedom-from-fault range. Furthermore, a plurality of tolerance ranges and/or a plurality of freedom-from-fault ranges can be predefined, so that classification into a plurality of diagnosis states is also possible for example.

As stated above, the calibration sensor can be, in particular, an encapsulated calibration sensor which can be operated independently without an external energy supply. In this case, encapsulation is intended to be understood to be, in general, embedding of the calibration sensor into an at least partially, preferably completely, closed housing, for example a metallic housing and/or a plastic housing. In particular, the calibration sensor can be designed as an autonomous sensor which can detect one or more reference values autonomously and without, for example, an energy supply line.

In particular, the calibration sensor can be a so-called data logger. Data loggers of this kind are generally commercially available for various state variables, for example for temperature, pressure or moisture or else for combinations of said state variables. In general, data loggers are autonomous measurement systems which can be operated autonomously and can receive measurement values and/or reference values without an external energy supply. In particular, data loggers of this kind can have data memories in which at least 10, preferably at least 1000, and particularly preferably at least 10,000, measurement values can be stored. The data logger can have, in particular, an interface, for example a wireless interface, via which the at least one reference value can be directly or indirectly transmitted to the controller. In this case, said interface may be, for example, a radio interface, for example a radio interface with a radio frequency of 2.4 GHz. The data logger can receive measurement values at a predefined or adjustable measurement frequency, for example at an interval of several 100 ms, several seconds or even longer time intervals. However, other refinements are also possible in general.

As stated above, the method can exhibit one or more additional method steps, not mentioned above. For example, before carrying out method step a), the method can furthermore comprise the following method step:

d) carrying out a calibration process for calibrating the calibration sensor, wherein the calibration sensor is calibrated in accordance with a predefined standard. In this case, one or more predefined and/or known state variables can be applied to the calibration sensor for example. By way of example, the calibration sensor can be calibrated by means of a calibrator, wherein the calibrator is designed to adjust a state variable, which is detected by the calibration sensor during the calibration process, to at least one predefined value. The at least one predefined value can be constant or can also be variable, for example variable over time. Therefore, the at least one predefined value can undergo, for example, a predefined change over time. By way of example, temperature curves and/or pressure curves with a predefined profile can be set in this way. The calibrator may be, for example, a thermal chamber and/or a heating apparatus which is designed to set predefined and known temperatures. However, as an alternative or in addition, other standards can also be used. For example, the calibration sensor can be calibrated by prespecifying two or more known temperature points, for example by iced water being applied to the calibration sensor once, for example by said calibration sensor being dipped into iced water, and furthermore boiling water being applied to said calibration sensor, for example by said calibration sensor being dipped into boiling water. Two measurement points which, as is known, correspond to 0° C. and 100° C. can be generated in this way for example. As an alternative, it is possible for only one of these measurement points to be determined for example. Deviations in the measurement value of the calibration sensor from said known values can then be used, for example, to correct the calibration sensor, so that the calibration sensor actually indicates 0° C. when iced water is applied to it and 100° C. when boiling water is applied to it, for example after carrying out the calibration process.

The calibration process of the calibration sensor itself is preferably carried out independently, in particular independently with respect to time, over the course of the rest of the method according to the invention, that is to say, for example, independently of method steps a)-c). The cleaning device can also be physically independent, so that, for example, the calibration process can be carried out at a location which is different to the location of the cleaning device. For example, the maintenance personnel arrive at the cleaning device which is to be tested with a pre-calibrated calibration sensor.

As an alternative or in addition, the method can comprise one or more further method steps. For example, after carrying out method step c), the method can further comprise the following method step:

e) terminating the electronic connection between the calibration sensor and the controller.

For example, the calibration sensor can be disconnected from the cleaning device and, in particular, from the controller for the purpose of carrying out regular operation of the cleaning device, for example normal field operation for cleaning washware. Accordingly, after carrying out method step e), the following method step can further be carried out:

f) carrying out at least one cleaning program for cleaning washware by means of the cleaning device, wherein the cleaning program is controlled by the controller, taking into account the correction function. In other words, the cleaning program can be carried out in such a way that the correction function is taken into account when carrying out the cleaning program, that is to say that, for example, measurement values of the at least one sensor of the cleaning device are directly or indirectly corrected by means of the correction function during the cleaning program.

As stated above, the state variable can comprise, in particular, at least one temperature. The cleaning device can be designed, in particular, to monitor a thermal hygiene effect on washware taking into account the temperature during at least one cleaning program. For example, thermal equivalents can be calculated during the cleaning program by tracking the application of temperature to the washware and a current calculation of the application of thermal equivalents can be performed. By way of example, standards, such as the standard EN ISO 15883 and/or NSF Standard 3 for example, can be used for this purpose. By way of example, the cleaning device can be designed to register application of thermal equivalents, for example selected from A0 values and/or H.U.E values, to the washware during the cleaning program. In this respect, reference can be made, for example, to documents DE 10 2004 056 052 A1 and or DE 10 2007 025 263 A1 mentioned above and the methods mentioned in said documents. Using the correction function allows the application of thermal equivalents and the hygiene effect produced as a result to be considerably more reliable than in the case of conventional methods. In particular, the cleaning device can be designed to monitor a thermal hygiene effect on washware taking into account the temperature during a cleaning program, wherein method step c) can comprise adjusting a correction function to match the thermal hygiene effect. For example, instead of the uncorrected measurement values of the sensor of the cleaning device, corrected measurement values can be used for calculating and/or detecting the hygiene effect.

As stated above, all or some of the one or more above-mentioned method steps can be carried out repeatedly. In particular, method steps a) and b) can also be carried out in an iterative and/or continuous manner. For example, reference values can be continuously transmitted from the calibration sensor to the controller.

In method step c), the correction function can be stored, in particular, in at least one data memory of the controller. In this way, the correction function can be available, for example, in subsequent method steps.

A cleaning device for cleaning washware is proposed in a further aspect of the present invention. The cleaning device comprises at least one sensor for detecting at least one state variable. The cleaning device further comprises at least one interface for establishing an electronic connection to at least one calibration sensor. The controller is designed to receive at least one reference value, which is detected by the calibration sensor independently of the sensor of the cleaning device, of the state variables via the interface. The controller is further designed to carry out a comparison of the reference value with at least one measurement value of the sensor of the cleaning device and to adjust at least one correction function in accordance with the comparison and also to automatically correct future measurement values of the sensor of the cleaning device using the correction function.

The cleaning device can be designed, in particular, to carry out a method according to one or more of the refinements presented above. Accordingly, reference can be made to the above description for possible refinements of the cleaning device.

The cleaning device can have, in particular, at least one cleaning chamber and can be designed, in particular, to apply at least one cleaning fluid, that is to say a liquid and/or gaseous detergent, to washware in the cleaning chamber. For example, the cleaning device can contain one or more nozzles for this purpose. The cleaning chamber can be a single cleaning chamber or can also comprise a plurality of cleaning chambers. In particular, the cleaning chamber can also comprise a cleaning tunnel. Therefore, the washware can, in general, be stationary in the cleaning chamber or can be transported through the cleaning chamber.

The controller can be designed, in particular, to carry out at least one cleaning program. In this case, a cleaning program is intended to be understood to be a sequence of program steps in which the washware is treated in different ways. For example, the cleaning program can comprise pre-washing, main washing, disinfection, drying or a combination of two or more of said method steps. However, other refinements are also possible in principle.

The controller can be designed, in particular, to detect and/or to set the at least one state variable during the cleaning program. For example, the controller can be designed to detect and, for example, to record a temperature within the cleaning chamber and/or a temperature of the cleaning fluid during the cleaning program. In this way, it is possible, as stated above, for example, for thermal equivalents which have been applied to the washware to be detected. However, as an alternative or in addition, the controller can also be designed to influence one or more state variables in a targeted manner, for example by the temperature in the cleaning chamber and/or the temperature of the cleaning fluid being adjusted in a targeted manner. By way of example, the controller can comprise a regulating means in order to adjust the temperature and/or another state variable to a setpoint value.

As stated above, the cleaning device can be selected, in principle, from the field of dishwashing technology, in particular commercial dishwashing technology, or from the field of cleaning utensils for example. In particular, the cleaning device can be selected from the group comprising: a dishwasher, in particular a commercial dishwasher, preferably a batch dishwasher and/or a conveyor dishwasher; and a cleaning and disinfection apparatus for cleaning containers for collecting human waste. Reference can be made, for example, to DE 10 2007 025 263 A1, which is described above and describes both cleaning and disinfection apparatuses and also batch and conveyor dishwashers, or to DE 10 2004 056 052 A1 for possible refinements of these cleaning devices. However, other refinements are also possible in principle.

A construction kit is proposed in a further aspect of the present invention. Within the scope of the present invention, a construction kit, also called kit, is intended to be understood to be, in general, a combination of two or more elements which are independent in principle and can be handled independently but, within the scope of the present invention, can interact in order to fulfill a prespecified purpose of the construction kit. The construction kit comprises:
  the cleaning device according to one or more of the refinements presented above, and
  at least one calibration sensor,
wherein the construction kit is designed to carry out the method according to the present invention.

The method, the cleaning device and the construction kit according to the present invention exhibit numerous advantages over conventional methods and devices. Therefore, the method can be carried out both within the scope of production of the cleaning device and also, for example, within the scope of maintenance work or installation work in practical use or field use. Calibration sensors include, for example, measurement devices, for example sensors which can be inserted into the cleaning chamber through one or more openings. Furthermore, commercial data loggers which can be used, for example, after programming and activation, for example in the cleaning chamber, also called treatment chamber, and which can record measurement values can be used. These recordings can then be called up by the data logger and electronically transmitted to the controller. Data loggers can usually be designed in a fully encapsulated manner and can communicate with a base station and/or with the controller by radio in a wireless manner. Data loggers can be designed, for example, as temperature data loggers or else as pressure data loggers. Loggers for other physical measurement values, such as the degree of moisture for example, are feasible and commercially available.

In particular, a large number of complicated manual steps which are susceptible to faults can be avoided with the proposed method. For example, in particular within the scope of the present invention, manual intervention in a control system of the cleaning device can be avoided, so that a high level of expenditure in respect of time and a high degree of susceptibility to faults can be avoided. The process can be carried out in an at least largely automated manner.

In particular, an automatic temperature sensor test and/or an automatic temperature sensor calibration or even, as stated above, automatic thermal equivalent validation, for example A0 value validation, can be carried out. In this case, independent measurement systems can be used as the calibration sensor or calibration sensor system in general. For example, as stated above, data loggers from the controller of the machine can be used for said calibration purposes. The independent measurement system, which acts as a calibration sensor, can also comprise sensors for a plurality of measurement points. For example, a calibration sensor can comprise a plurality of individual sensors for a plurality of measurement points.

The basis for carrying out the present method can be corresponding controller hardware and/or controller software of the cleaning device which can be implemented entirely or partially in the controller or which can also be at least partially integrated into other constituent parts of the cleaning device. The cleaning device can therefore be designed in a safety-oriented and inherently safe manner.

As stated above, the at least one reference value can be transmitted to the controller in various ways. In particular, transmission can be performed by means of radio, for example a radio protocol such as Bluetooth for example. The transmission protocol can contain at least one time stamp, for example, in order to avoid inconsistencies. Furthermore, the transmission protocol can contain the respectively relevant measurement data and/or reference values and also possibly one or more control commands. Further contents of the transmission protocol can be, for example, one or more items of identification information. Therefore, in general, at least one additional item of information can be transmitted in addition to the at least one reference value a in method step b), for example at least one additional item of information selected from the group comprising: an item of time information, in particular a time stamp; a control command and an item of identification information. The item of identification information can identify, for example, the respective calibration sensor, and therefore a plurality of calibration sensors can also be used for example. The item of identification information can prevent the transmitted information of different calibration sensors being mixed up. Furthermore, as an alternative or in addition, proof of the valid calibration of the independent calibration sensor, which can be designed as an independent measurement system, and/or of constituent parts of said calibration sensor can be demonstrated.

As stated above, the controller can be designed to match the time stamps. The controller can further be designed to initiate one or more of method steps a) and/or b) in full or in part. For example, the controller can be designed to initiate the calibration measurement. By way of example, the controller can trigger temperature measurement in the form of an individual value or a series of a certain quality on the calibration sensor with a defined apparatus identification number. The controller can be designed to receive measurement data, in particular one or more reference values, from the calibration sensor, for example the independent temperature measurement system, with the same apparatus identification number and, for example, to check for plausibility on the basis of the time stamp. The controller can further be designed to perform corresponding evaluations from the measurement data of the at least one calibration sensor and the at least one sensor which is integrated in the cleaning device, said evaluations having been described above in general as adjustment of a correction function. By way of example, a function of the measurement chain, which is incorporated in the cleaning device, in the form of one or more sensors can be confirmed, or a malfunction can be identified, in this way. In general, this function can be called a diagnosis function. Furthermore, it is possible, as an alternative or in addition, for a required correction value for the measurement chain to be calculated and for a parameter for adapting the measurement value of the incorporated measurement chain to the actual value to be generated/ changed, that is to say for the temperature measurement chain to be calibrated.

The evaluations and derived measures can be stored internally in the controller of the cleaning device. In general, evaluations, test records and/or status and diagnosis data can also be transmitted from the controller to suitable terminal devices in a wireless or wired manner.

Checking the at least one sensor of the cleaning device, for example an incorporated measurement chain, by means of the at least one calibration sensor, for example by means of a radio thermal logger, provides a large number of advantages over known methods. In particular, this checking is possible without using other hardware and/or software equipment. In particular, this checking can be performed without additional apparatuses such as a laptop, computer or similar additional devices for example. In this respect, the outlay on equipment for implementing the method according to the invention is low.

Furthermore, the calibration measurement can be carried out, in particular, without using special temperature calibrators, water baths or similar additional expenditure on equipment. The calibration according to the present method can, in particular, check the sensors of the cleaning device in their installed state, so that the actual state, that is to say the actual wiring, circuitry and design, of the measurement chain of these sensors can also be checked. As a result, a maximum degree of accuracy and safety can be achieved when checking functioning. In addition, expenditure which is usually necessary for disassembling the sensors and separately checking the sensors can be avoided or at least reduced.

Functional checking of the cleaning device on a test rig after assembly and/or in the field after any possible repair or maintenance work can be performed only using a commercially available data logger, for example using a commercially available thermal logger. Owing to the additional use of the measurement values of the calibration sensor, for example the data logger, during automatic calibration, virtually no additional work is required on the part of the user and/or the maintenance personnel.

Therefore, a cost-effective and reliable method can be realized, with no compromises in respect of the accuracy of the measurements having to be made when said method is applied during production of the cleaning device and/or during maintenance on site, so that the entire sensor measurement chain can be checked and calibrated with a comparatively low level of expenditure on equipment and handling work.

It is also possible for a plurality of sensors of the cleaning device to be checked and matched in one calibration process, for example by the at least one calibration sensor having a plurality of calibration sensors which can be addressed at the same time or one after the other by the controller of the cleaning device. As an alternative or in addition, the controller can also comprise calibration software which, for example, instructs and/or prompts maintenance personnel to move the calibration sensor to different regions of the cleaning device in succession and/or to place the calibration sensor at different points. This ensures a high degree of flexibility and the calibration process can be implemented in a reliable manner with respect to handling in this way.

As stated above, the invention is not restricted to calibrating temperature sensors. As an alternative or in addition to one or more temperature sensors, one or more other types of sensor can be calibrated and, in particular, matched, for example one or more pressure sensors and/or one or more moisture sensors.

In summary, the following embodiments are particularly preferred within the scope of the present invention:

Embodiment 1

Method for calibrating a cleaning device, wherein the cleaning device has at least one sensor for detecting at least one state variable, wherein the method comprises the following steps:
a) carrying out a calibration measurement, wherein the at least one state variable is detected and at least one reference value is determined by means of at least one calibration sensor independently of the sensor of the cleaning device;
b) establishing an electronic connection between the calibration sensor and a controller of the cleaning device, and electronically transmitting the reference value to the controller; and
c) comparing the reference value with at least one measurement value of the sensor of the cleaning device and adjusting at least one correction function in accordance with the comparison, wherein future measurement values of the sensor of the cleaning device are automatically corrected using the correction function.

Embodiment 2

Method according to the preceding embodiment, wherein method step b) is carried out automatically.

Embodiment 3

Method according to one of the preceding embodiments, wherein method step c) is carried out automatically.

Embodiment 4

Method according to one of the preceding embodiments, wherein, during the comparison of the reference value with the at least one measurement value of the sensor in method step c), at least one difference between the reference value and the measurement value is calculated, wherein the correction function contains the difference as an offset, wherein the offset is automatically subtracted from future measurement values of the sensor of the cleaning device or is automatically added to future measurement values of the sensor of the cleaning device.

Embodiment 5

Method according to one of the preceding embodiments, wherein, during the comparison of the reference value with the at least one measurement value of the sensor in method step c), at least one quotient between the reference value and the measurement value is calculated, wherein the correction function contains the quotient or the inverse of said quotient as a correction factor, wherein the correction factor is automatically multiplied by future measurement values of the sensor of the cleaning device.

Embodiment 6

Method according to one of the preceding embodiments, wherein the state variable contains at least one variable selected from the group comprising: a temperature, in particular a temperature in a cleaning chamber of the cleaning device and/or a temperature of at least one cleaning fluid; a pressure, in particular a pressure in a cleaning chamber of the cleaning device; a degree of moisture, in particular a degree of moisture in a cleaning chamber of the cleaning device; a volume flow and/or a mass flow, in particular a volume flow and/or a mass flow in a section of a line system of the cleaning device.

Embodiment 7

Method according to one of the preceding embodiments, wherein the electronic transmission in method step b) exclusively involves transmission in electronic form.

Embodiment 8

Method according to one of the preceding embodiments, wherein method step b) is carried out via at least one electronic interface.

Embodiment 9

Method according to one of the preceding embodiments, wherein method step b) is carried out by means of a wireless connection, in particular a radio connection.

Embodiment 10

Method according to one of the preceding embodiments, wherein an interface selected from amongst an infrared interface, a WLAN interface and a Bluetooth interface is used in method step b).

Embodiment 11

Method according to one of the preceding embodiments, wherein method step b) is carried out using a docking station, wherein the calibration sensor is connected to the docking station in order to establish the electronic connection, wherein the reference value is transmitted from the calibration sensor to the docking station, and wherein the reference value is transmitted to the controller by the docking station.

Embodiment 12

Method according to one of the preceding embodiments, wherein the calibration sensor has at least one data memory and is designed to detect a plurality of reference values and to store said plurality of reference values in the data memory.

Embodiment 13

Method according to the preceding embodiment, wherein the plurality of reference values comprises a time sequence of the reference values.

Embodiment 14

Method according to one of the two preceding embodiments, wherein the calibration sensor is further designed to store in the data memory the time points at which the reference values were detected for each of the plurality of reference values.

Embodiment 15

Method according to the preceding embodiments, wherein the controller is designed to register, in addition to the at least one measurement value of the sensor of the cleaning device, at least one time point at which the measurement value was detected and to compare the time point at which the measurement value was detected with the time points at which the reference values were detected.

Embodiment 16

Method according to one of the four preceding embodiments, wherein the calibration sensor is designed to transmit the plurality of reference values to the controller.

Embodiment 17

Method according to one of the preceding embodiments, wherein, in method step c), a warning is generated when, during the comparison of the reference value with the measurement value, a deviation outside a predefined tolerance range is ascertained.

Embodiment 18

Method according to one of the preceding embodiments, wherein, in method step c), a freedom-from-fault message is output when, during the comparison of the reference value with the measurement value, a deviation within a predefined freedom-from-fault range is ascertained.

Embodiment 19

Method according to one of the preceding embodiments, wherein the calibration sensor is an encapsulated calibration sensor which can be operated independently without an external energy supply.

Embodiment 20

Method according to one of the following embodiments, wherein the calibration sensor is a data logger.

Embodiment 21

Method according to one of the preceding embodiments, wherein, before carrying out method step a), the method furthermore comprises the following method step:
d) carrying out a calibration process for calibrating the calibration sensor, wherein the calibration sensor is calibrated in accordance with a predefined standard.

Embodiment 22

Method according to the preceding embodiment, wherein a calibrator is used in order to carry out the calibration process in method step d), wherein the calibrator is designed to set a state variable, which is detected by the calibration sensor during the calibration process, to a defined value.

Embodiment 23

Method according to one of the preceding embodiments, wherein, after carrying out method step c), the method furthermore comprises the following method step:
e) terminating the electronic connection between the calibration sensor and the controller.

Embodiment 24

Method according to the preceding embodiment, wherein, after carrying out method step e), the method furthermore comprises the following method step:
f) carrying out at least one cleaning program for cleaning washware by means of the cleaning device, wherein the cleaning program is controlled by the controller, taking into account the correction function.

Embodiment 25

Method according to one of the preceding embodiments, wherein the state variable comprises at least one temperature, wherein the cleaning device is designed to monitor a thermal hygiene effect on washware taking into account the temperature during a cleaning program, wherein method step c) comprises adjustment of a correction function for the thermal hygiene effect.

Embodiment 26

Method according to one of the preceding embodiments, wherein method steps a) and b) are carried out in an iterative and continuous manner.

Embodiment 27

Method according to one of the preceding embodiments, wherein, in method step c), the correction function is stored in a data memory of the controller.

Embodiment 28

Cleaning device for cleaning washware, comprising at least one sensor for detecting at least one state variable, further comprising at least one controller, wherein the controller has at least one interface for establishing an electronic connection to at least one calibration sensor, wherein the controller is designed to receive at least one reference value, which is detected by the calibration sensor independently of the sensor of the cleaning device, of the state variables via the interface, wherein the controller is further designed to carry out a comparison of the reference value with at least one measurement value of the sensor of the cleaning device and to adjust at least one correction function in accordance with the comparison and also to automatically correct future measurement values of the sensor of the cleaning device using the correction function.

Embodiment 29

Cleaning device according to the preceding embodiment, wherein the cleaning device has at least one cleaning chamber and is designed to apply at least one cleaning fluid to washware in the cleaning chamber.

Embodiment 30

Cleaning device according to either of the preceding embodiments which relates to a cleaning device, wherein the controller is designed to carry out at least one cleaning program.

Embodiment 31

Cleaning device according to the preceding embodiment, wherein the controller is designed to detect and/or to set the state variable during the cleaning program.

Embodiment 32

Cleaning device according to one of the preceding embodiments which relates to a cleaning device, wherein the cleaning device is selected from the group comprising: a dishwasher, a container washer, a disinfection washer and a cleaning and disinfection apparatus for cleaning containers for collecting human waste.

Embodiment 33

Construction kit comprising:
the cleaning device as claimed in one of the preceding claims which relates to a cleaning device, and
at least one calibration sensor,
wherein the construction kit is designed to carry out the method according to one of the preceding embodiments which relates to a method.

BRIEF DESCRIPTION OF THE FIGURES

Further details and features of the invention can be found in the following description of preferred exemplary embodiments, in particular in conjunction with the dependent claims. In this case, the respective features may be implemented on their own or in combination with one another in groups of two or more. The invention is not limited to the exemplary embodiments. The exemplary embodiments are shown schematically in the figures. Identical reference numerals in the individual figures denote elements which are the same or have the same function or correspond to one another in terms of their functions.
Specifically.

DESCRIPTION OF THE EXEMPLARY EMBODIMENTS

Figure 1:
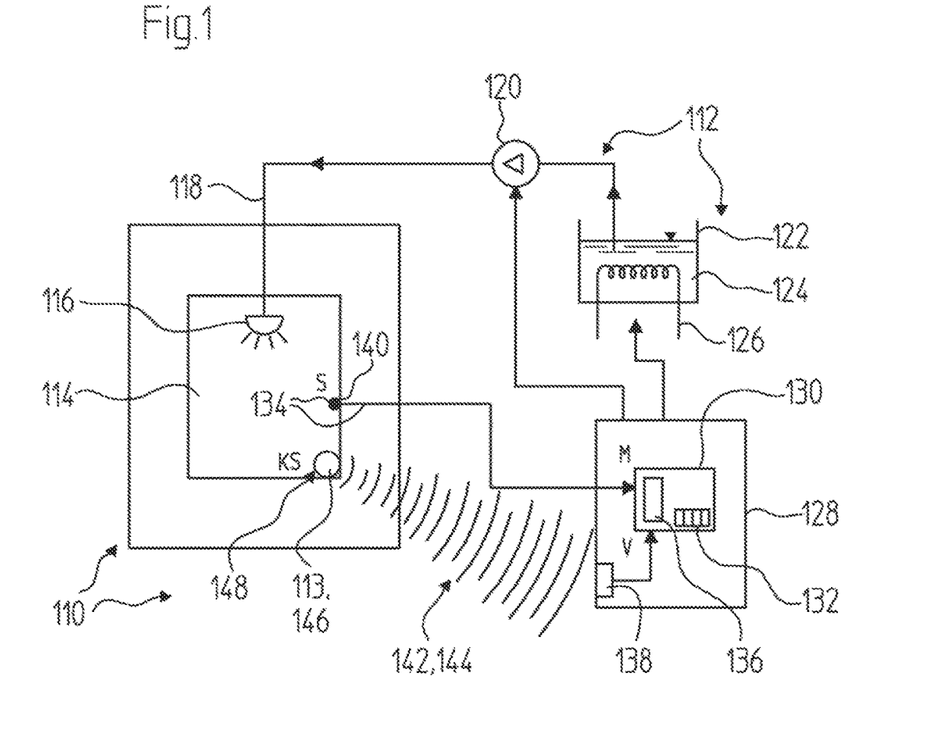
FIG. 1: shows a construction kit and a cleaning device according to the present invention.

FIG. 1 shows an exemplary embodiment of a construction kit 110 according to the invention which comprises a cleaning device 112 and at least one calibration sensor 113. In the text which follows, the invention is described by way of example using the example of a cleaning device 112 in the form of a dishwasher or a cleaning and disinfection apparatus having a cleaning chamber 114 in which a cleaning fluid 124 can be applied to washware, not illustrated in any detail, by means of a nozzle system 116, a supply line 118 and a pump 120 from a tank 122 during operation. The cleaning fluid is heated by a heating device 126, for example a flow heater and/or a boiler. It should be noted that numerous other embodiments of the cleaning device 112 are feasible. For example, embodiments in which steam is used as cleaning fluid 124 at least in one method step are feasible, and therefore a steam generator can be provided for example. Furthermore, cleaning devices 112 in which, in contrast to the illustrated batch cleaning device 112, also called a single-chamber batch cleaning device 112, a plurality of chambers can be provided, for example in the form of conveyor dishwashers in which the washware passes through a plurality of chambers, are feasible.

The cleaning device 112 has a controller 128 which is only symbolically shown in FIG. 1. This controller 128 can comprise, for example, a central computer unit 130 and/or a data memory 132. The controller is designed to control and/or to regulate the operation of the cleaning device 112. To this end, the controller 128 can control and/or regulate, for example, operation of the pump 120 and/or of the heating device 126. Furthermore, the controller 128, for example the central computer unit 130, can be designed, for example, to control one or more cleaning programs. The central computer unit 130 can comprise, for example, a data processing device, in particular at least one microcomputer, in which, for example, parameters for the program sequence of the at least one cleaning program can be stored.

In order to be able to correctly control the cleaning device 112, the controller 128 accesses information in one or more sensors 134 (denoted by S in FIG. 1). The at least one sensor 134 may be, for example, at least one temperature sensor. However, as stated above, other examples are also possible. The sensor 134 can detect, for example, a temperature in the interior of the cleaning chamber 114. The controller 128 and, in particular, the central computer unit 130 can be designed, for example, to track a temperature profile in the interior of the cleaning chamber 114 and, for example in accordance with one or more of the methods described in DE 10 2004 056 052 A1 and/or DE 10 2007 025 263 A1, to calculate thermal equivalents which are applied to the washware during cleaning. This can be performed, for example, in accordance with corresponding standards, as stated above.

Furthermore, the cleaning device 112 preferably has a calibration unit 136 in this or in other exemplary embodiments. This calibration unit 136 can be, for example, a constituent part of the central computer unit 130 or else can form a separate unit, wherein a centralized or else decentralized design of the calibration unit 136 is possible. The calibration unit 136 can also be designed entirely or partially in the form of one or more program modules which can be a constituent part of a program-related device of the controller 128. The calibration unit 136 is connected to an interface 138 which is a constituent part of the controller 128 and by means of which the controller 128 can communicate with the at least one calibration sensor 113 (denoted by KS in FIG. 1). The at least one calibration sensor is designed to detect the same state variable which is also detected by the sensor 134. By way of example, both the sensor 134 and the calibration sensor 113 can be designed to detect a temperature. If a plurality of sensors 134 are provided, said sensors can detect the same state variables or else different state variables. In this case, calibration sensors 113 can be provided for one or more of these state variables in each case. By way of example, FIG. 1 shows an example in which both the sensor 134 and the calibration sensor 113 detect a temperature in the interior of the cleaning chamber 114 as a state variable.

However, the at least one sensor 134 generally does not only comprise the actual sensor element 140 but furthermore generally also has a series of further elements in the form of supply lines, measurement printed circuit boards, amplifiers, converters or similar elements, and therefore a measurement chain is run through before finally the controller 128 and there, in particular, the central computer unit 130 are provided with a measurement value (denoted by M in FIG. 1).

The calibration sensor 113 is designed to communicate with the controller 128 via the interface 138. The calibration sensor 113 can, for example, have a dedicated interface for this purpose. In particular, said interface may be a radio interface and particularly preferably a Bluetooth interface. A radio connection 142 is symbolically shown in FIG. 1. However, other connections are also possible in principle. At least one reference value V, which is generated by the calibration sensor 113, is transmitted to the controller 128 and there, in particular, to the central computer unit 130 by means of the radio connection 142.

FIG. 1 shows a state during a calibration measurement in which the calibration sensor 130 actually carries out a calibration measurement and detects the at least one state variable independently of the sensor of the cleaning device. In this and in other exemplary embodiments, this detection is preferably performed at least approximately at the same time, for example within a predefined time window, so that the measurement value M and the reference value V are detected at least approximately at the same time within the scope of a calibration measurement. After the calibration measurement is carried out, the calibration sensor 130 can be removed from the cleaning device 112 again and can be used, for example, to calibrate other cleaning devices. Therefore, FIG. 1 does not show normal operation of the cleaning device 112 but rather a state which is preferably assumed exclusively during a calibration operation.

Figure 2:
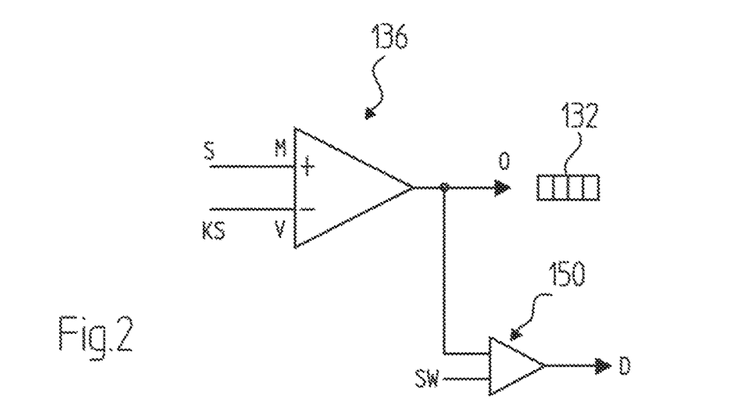
FIG. 2: shows a calibration unit of a controller of a cleaning device.

FIG. 2 schematically shows the calibration unit 136 which processes the measurement value M of the sensor S and the reference value V of the calibration sensor KS by these values being compared and by a correction function being determined. By way of example, a difference between the values M and V can be calculated in a simple manner, as shown in FIG. 2, wherein an offset O is generated by way of example, it then being possible to store said offset, for example, in the data memory 132 again. During normal operation of the cleaning device 112, for example while a cleaning program is being carried out, this offset O can then be subtracted, for example, from measurement values of the sensor S or added to said measurement values. However, other correction functions are also possible in principle. For example, as stated above, the thermal equivalents can be corrected.

Furthermore, the calibration unit 136 can also fulfill diagnosis functions. For example, during the comparison, the determined offset O in one or more comparison units 150 can be compared with one or more threshold values (symbolically denoted by SW in FIG. 2). According to this comparison, a diagnosis result D can be created, for example in the form of a warning and/or in the form of a freedom-from-fault message.

The radio connection 142 shown in FIG. 1 merely constitutes an exemplary embodiment of a possible electronic connection 144 between the calibration sensor 113 and the controller 128. As stated above, other refinements can also be used.

The calibration sensor 113 can be designed, in particular, as a data logger 146 and can comprise, for example, a dedicated data memory 148. Reference values and possibly additional information, such as time stamps for example, can be stored in this data memory 148. Said additional information can also be transmitted to the controller 128 by means of the electronic connection 144. Furthermore, at least one identification number of the data logger 146 can be transmitted by means of the electronic connection 144. By way of example, reference can be made to the sensors and data loggers manufactured by ebro Electronic GmbH, Ingolstadt, Germany, for possible data loggers. A temperature data logger with a radio connection, for example an EBI 10-T100 type data logger, can be used for example. However, as an alternative or in addition, a large number of other calibration sensors 113 can also be used.

LIST OF REFERENCE SYMBOLS

110 Construction kit
112 Cleaning device
113 Calibration sensor
114 Cleaning chamber
116 Nozzle system
118 Supply line
120 Pump
122 Tank
124 Cleaning fluid
126 Heating device
128 Controller
130 Central computer unit
132 Data memory
134 Sensor
136 Calibration unit
138 Interface
140 Sensor element
142 Radio connection
144 Electronic connection
146 Data logger
148 Data memory
150 Comparison unit

The invention claimed is:

1. A method for calibrating a cleaning device, wherein the cleaning device has at least one sensor for detecting at least one state variable, wherein the method comprises the following steps:
   a) carrying out a calibration measurement, wherein the at least one state variable is detected and at least one reference value is determined via at least one calibration sensor independently of the sensor of the cleaning device;
   b) establishing an electronic connection between the calibration sensor and a controller of the cleaning device, and electronically transmitting the reference value to the controller;
   c) matching the reference value determined at a given time with at least one measurement value of the sensor of the cleaning device measured within a predetermined range of time with respect to the given time; and
   d) comparing the matched reference value and at least one measurement value and adjusting at least one correction function in accordance with the comparison, wherein future measurement values of the sensor of the cleaning device are automatically corrected using the correction function,
   wherein the state variable comprises at least one temperature, wherein the cleaning device is configured to monitor a thermal hygiene effect on washware taking into account the temperature during a cleaning program, and
   wherein method step d) comprises adjustment of a correction function for the thermal hygiene effect.

2. The method as claimed in claim 1, wherein, during the comparison of the matched reference value and at least one measurement value of the sensor in method step d), at least one difference between the reference value and the measurement value is calculated, wherein the correction function contains the difference as an offset, wherein the offset is automatically subtracted from future measurement values of the sensor of the cleaning device or is automatically added to future measurement values of the sensor of the cleaning device.

3. The method as claimed in claim 1, wherein, during the comparison of the matched reference value and at least one measurement value of the sensor in method step d), at least one quotient between the reference value and the measurement value is calculated, wherein the correction function contains the quotient or an inverse of the quotient as a correction factor, wherein the correction factor is automatically multiplied by future measurement values of the sensor of the cleaning device.

4. The method as claimed in claim 1, wherein a plurality of state variables are detected, and wherein the plurality of state variable further contains at least one variable selected from the group comprising: a pressure; a degree of moisture; a volume flow; and a mass flow.

5. The method as claimed in claim 1, wherein method step b) is carried out by via a wireless connection.

6. The method as claimed in claim 1, wherein the calibration sensor has at least one data memory and is configured to detect a plurality of reference values and to store the plurality of reference values in the data memory.

7. The method as claimed in claim 6, wherein the plurality of reference values comprises a time sequence of the reference values.

8. The method as claimed in claim 6, wherein the calibration sensor is further configured to store in the data memory time points at which the reference values were detected for each of the plurality of reference values.

9. The method as claimed in claim 8, wherein the controller is further configured to register, in addition to the at least one measurement value of the sensor of the cleaning device, at least one time point at which the measurement value was detected and to compare the time point at which the measurement value was detected with the time points at which the reference values were detected.

10. The method as claimed in claim 1, wherein, in method step d), a warning is generated when, during the comparison of the matched reference value and measurement value, a deviation outside a predefined tolerance range is ascertained.

11. The method as claimed in claim 1, wherein, in method step d), a freedom-from-fault message is output when, during the comparison of the matched reference value and measurement value, a deviation within a predefined freedom-from-fault range is ascertained.

12. The method as claimed in claim 1, wherein the calibration sensor is an encapsulated calibration sensor configured to be operated independently without an external energy supply.

13. A cleaning device for cleaning washware, comprising:
   at least one sensor for detecting at least one state variable; and
   at least one controller, wherein the controller has at least one interface for establishing an electronic connection to at least one calibration sensor,
   wherein the controller is configured to:

receive at least one reference value, which is detected by the calibration sensor independently of the sensor of the cleaning device, of the at least one state variable via the interface, match the reference value determined at a given time with at least one measurement value of the sensor of the cleaning device measured within a predetermined range of time with respect to the given time;

compare the matched reference value and at least one measurement value of the sensor of the cleaning device, adjust at least one correction function in accordance with the comparison, and automatically correct future measurement values of the sensor of the cleaning device using the correction function, wherein the state variable comprises at least one temperature, wherein the cleaning device is configured to monitor a thermal hygiene effect on washware taking into account the temperature during a cleaning program, and wherein the controller is further configured to adjust the at least one correction function for the thermal hygiene effect.

14. A construction kit, comprising:

a cleaning device comprising
   at least one sensor for detecting at least one state variable; and
   at least one controller, wherein the controller has at least one interface for establishing an electronic connection to at least one calibration sensor; and at least one calibration sensor, wherein the controller is configured to:
   receive at least one reference value, which is detected by the calibration sensor independently of the sensor of the cleaning device, of the at least one state variable via the interface, match the reference value determined at a given time with at least one measurement value of the sensor of the cleaning device measured within a predetermined range of time with respect to the given time;

compare the matched reference value and at least one measurement value of the sensor of the cleaning device, adjust at least one correction function in accordance with the comparison, and automatically correct future measurement values of the sensor of the cleaning device using the correction function wherein the state variable comprises at least one temperature, wherein the cleaning device is configured to monitor a thermal hygiene effect on washware taking into account the temperature during a cleaning program, wherein the controller is further configured to adjust the at least one correction function for the thermal hygiene effect, and wherein the construction kit is configured to carry out the method of claim 1.

* * * * *